Aug. 15, 1933.　　　J. J. TOWNSEND　　　1,922,719
TRAILER BRAKE OPERATING MECHANISM
Filed Nov. 23, 1931
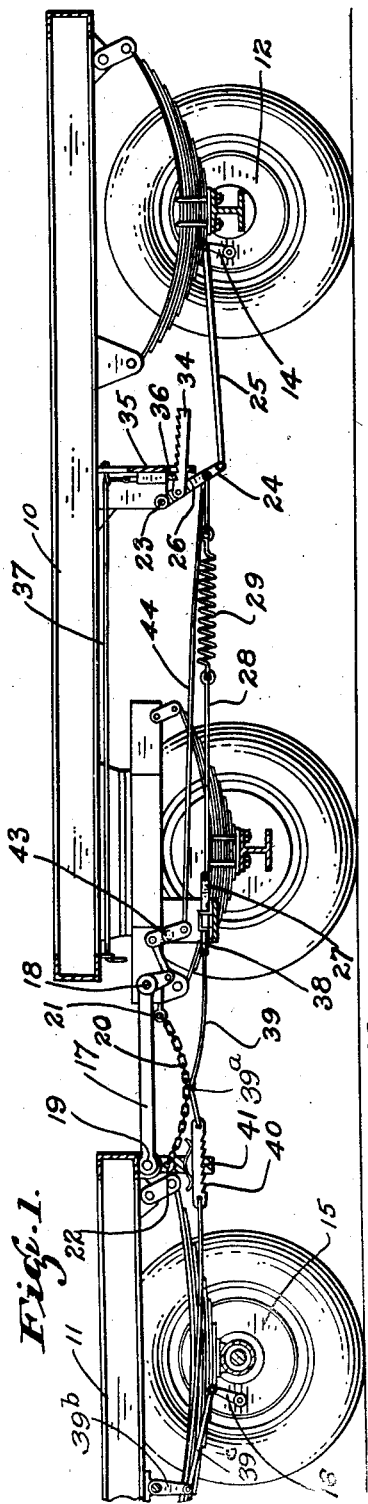
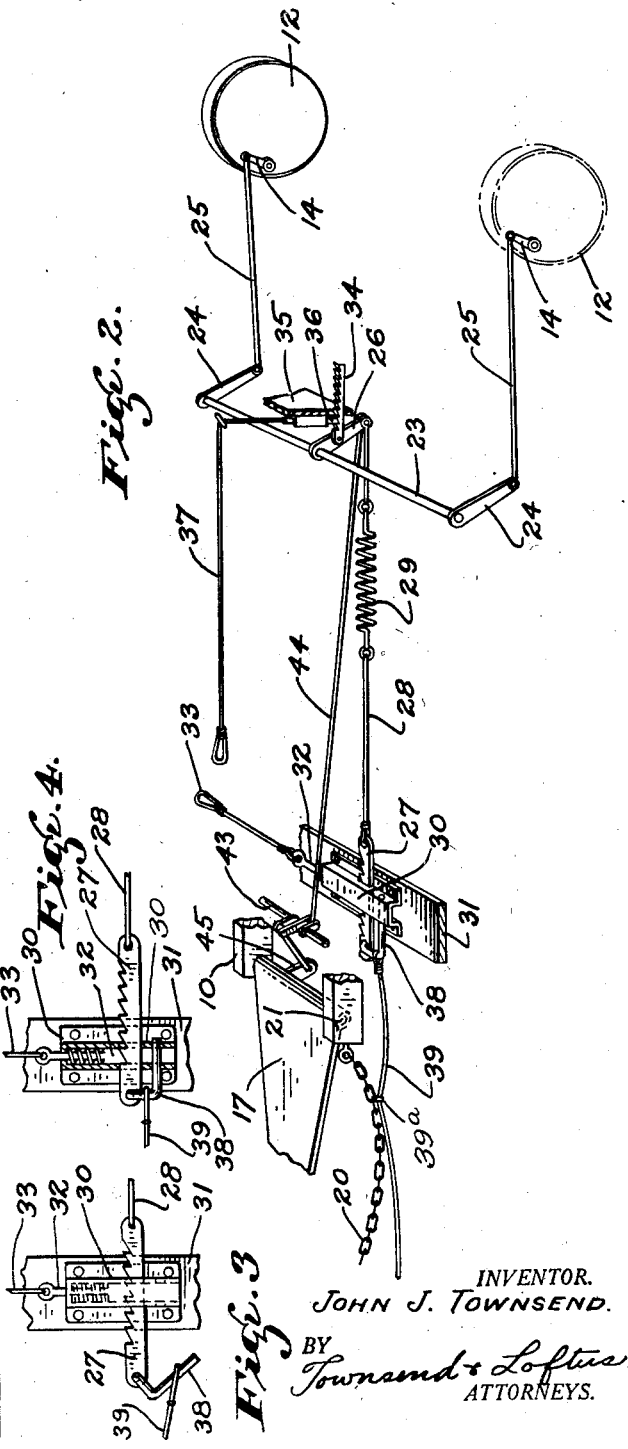
INVENTOR.
JOHN J. TOWNSEND.
BY Townsend + Loftus
ATTORNEYS.

Patented Aug. 15, 1933

1,922,719

UNITED STATES PATENT OFFICE 1,922,719

TRAILER BRAKE OPERATING MECHANISM

John J. Townsend, Hayward, Calif.

Application November 23, 1931
Serial No. 576,629

4 Claims. (Cl. 188—112)

This invention relates to a braking apparatus for trucks and trailers.

It is the principal object of the present invention to provide a braking apparatus capable of use in connection with trucks and trailers and adapted to automatically apply the trailer and truck brakes in the event that the drawbar connection between the trailer and truck becomes inadvertently disconnected during the time that the truck is drawing the trailer, the trailer braking apparatus being also capable of operation through the medium of the trailer drawbar when the trailer is disconnected from the truck.

One form which the invention may assume is exemplified in the following description and illustrated by way of example in the accompanying drawing, in which:

Fig. 1 is a view in longitudinal section through a truck and trailer showing my improved braking apparatus applied thereto.

Fig. 2 is a diagrammatic perspective view of my improved apparatus as applied to the trailer.

Figs. 3 and 4 are views of the ratchet and trigger mechanism forming a part of the trailer brake apparatus.

Referring more particularly to the accompanying drawing, 10 indicates a trailer adapted to be drawn by a truck 11. The rear wheels of the trailer are fitted with any preferred type of brakes 12, each brake having an operating lever 14. The rear wheels of the truck 11 are likewise fitted with brakes 15 as in standard practice, each brake having the usual operating lever 16.

The trailer 10 is detachably connected with the truck through the medium of a drawbar 17 which is pivotally connected to the trailer frame as at 18. The forward end of the drawbar may be detachably connected as at 19 to the truck in any preferred manner. The drawbar 17 is rigid as in standard practice and is so pivotally connected to the trailer 10 that it may oscillate in a vertical plane.

The portion of the trailer frame 10 to which the drawbar 17 is connected is pivoted about a vertical axis with respect to the main frame of the trailer 10 so that the front wheels of the trailer may turn in order that the trailer will track.

When the trailer 10 is connected with the truck 11, a connection is also established therebetween through the medium of a chain 20. This chain is fixed at one end as at 21 to the trailer frame and detachably connected as at 22 to the truck frame. This chain is of a length greater than the distance necessary to connect the truck with the trailer, so that it will be slack during the normal operation of the truck and trailer. This chain is provided so that there will be a connection between the truck and the trailer in the event that the drawbar 17 should break or accidentally become disconnected with the truck or trailer during the time that the truck is drawing the trailer.

I have provided an apparatus for applying the brakes of the trailer and truck in the event that the drawbar 17 should break or accidentally become disconnected with the trailer or truck during the operation thereof. This means comprises a transverse brake shaft 23 supported by the trailer frame beneath the same. Fixed on this shaft and depending therefrom are two crank arms 24 which are connected to the brake levers 14 of the trailer brakes 12 through the medium of brake rods 25. Also fixed on the brake shaft 23 and depending therefrom is a crank arm 26 which is connected to a ratchet rack 27 through the medium of a connector 28 interposed in which is a tension spring 29. This ratchet rack 27 is guided in a housing 30 secured on a transverse cross frame member 31 of the trailer frame. Mounted in this housing 30 is a spring-pressed reciprocable pawl 32 which may be operated by an operating member 33.

The arrangement of the pawl and ratchet rack 27 is such that when the rack is drawn forwardly the pawl will be ineffective but will act to prevent rearward movement of the rack 27. Forward motion of the connector 28 will apply the brakes 12 of the trailer and when the brakes are applied, the cooperation between the pawl 32 and the teeth of the ratchet rack 27 will prevent the release of the brakes until the pawl 32 is manually disengaged from the teeth of the ratchet rack 27. The spring 29 is provided in the connector 28 in order to insure proper application of the brakes.

A pawl and ratchet mechanism is also provided and operatively connected to the crank arm 26. This pawl and ratchet mechanism constitutes a ratchet rack 34 pivotally connected at its forward end to the crank arm 26. This ratchet rack 34 is guided for longitudinal reciprocation in a guide plate 35 formed as a fixed part of the trailer frame. Mounted on this guide plate is a vertically reciprocable spring-pressed pawl 36 adapted to cooperate with the teeth of the ratchet rack 34. This pawl and ratchet mechanism also acts to enable the crank arm 26 to be swung forwardly to apply the brakes 12, but acts automatically to prevent the release of the brakes until the pawl 36 is disengaged from the teeth of the ratchet rack 34 through the medium of a pull cable 37 which may be led to a convenient position at the forward end of the trailer.

In order that disengagement or breaking of the drawbar 17 will be accompanied by application of the trailer and truck brakes, the forward end of the ratchet rack 27 is fitted with a pivotal trigger 38, which trigger is bent in a right angular form as illustrated. A cable 39 is fixed at 39a to the chain 20 and one end thereof is looped so as to be looped over the trigger 38. In the event that the drawbar becomes disconnected with the truck or trailer or breaks, the chain 20 will immediately become taut and impart a pull to the cable 39. The initial portion of the pull will draw the rack 27 forwardly and apply the brakes through the medium of the connector 28, the crank arm 26, the brake shaft 23 and the connecting mechanism between the brake shaft and the brakes 12. The trigger 38 cooperates with holes in the member 30 as shown in Fig. 4 and it is sufficiently long that it will not disconnect therefrom until the brake is applied. However, immediately the brakes are applied, the trigger 38 will disengage from the member 30 and will swing about its pivotal connection with the rack 27 and disengage from the loop of the cable 39 in a manner more clearly illustrated in Figs. 3 and 4.

The other end of the cable 39 is connected to the arms 39b of the truck brake mechanism which are connected by brake rods 39c to the operating levers 16 of the truck brakes 15, so that when the chain 20 is drawn taut, the brake operating levers 16 of the truck brakes will be actuated to apply the truck brakes. When the truck brakes are applied, they are prevented from releasing through the medium of a ratchet rack 40 engaging a stationary pawl 41 carried by the truck frame, the ratchet rack 40 being interposed in that portion of the cable 39 connecting the chain 20 with the mechanism for operating the truck brakes 15.

At times it is desirable to operate the trailer brakes when the trailer is disconnected from the truck. I accomplish this in the present instance by providing what I prefer to term a crank shaft 43 which is arranged parallel to the rearmost end of the drawbar 17. One crank on this crank shaft is connected with a connector 44 which is connected at one end to the crank arm 26. The other crank of this crank shaft is connected to a crank lever 45 which is rigid with respect to the drawbar 17. The relation between these cranks is such that vertical swinging movement of the drawbar 17 will act to apply and release the brakes 12 through the medium of the connector 44, the crank arm 26, the brake shaft 23 and the mechanism connecting the brake shaft with the brakes 12. If desired a connection may be made between the cable 37 and this crank shaft so that by vertically moving the drawbar, the pawl 36 may be released to enable releasing of the brakes by operation of the drawbar 17; it being necessary, of course, to either automatically or otherwise release this pawl when desiring to release the brakes 12.

In operation of the device, when it is desired that the trailer be drawn by the truck, the drawbar 17 and the chain 20 are connected with the truck frame as previously described. The cable 39 is then connected at one end with the trigger 38 and its opposite end with the operating mechanism of the truck brakes 15. The brakes of the trailer 12 are, of course, released.

In the event that the drawbar 17 should become disconnected from either the truck or the trailer during the time that the truck is drawing the trailer, the chain 20 will be drawn taut and will apply both the truck and trailer brakes as previously described. These brakes will be held applied through the medium of the pawl and ratchet mechanisms described.

In order to release the trailer brakes, it will be necessary to release both pawl and ratchet mechanisms. Two of these are provided for the trailer in view of the tension spring 29 which tends to take up the brakes to the fullest extent after a pull has been applied to the cable 39. The brake application, of course, is limited by the strength of the spring 29.

When it is desired to operate the trailer brakes when the trailer is disconnected from the truck, it is only necessary to vertically oscillate the drawbar 17, which will apply and release the trailer brakes. In this manner the trailer may be easily maneuvered by one man.

The foregoing apparatus for operating the trailer and truck brakes is, of course, auxiliary to the usual trailer brake mechanism or apparatus which is operated from the truck, the present invention not relating to service brakes for either the truck or trailer but to an emergency system for applying the brakes in the event that the trailer should accidentally become disconnected from the truck during the time it is being drawn thereby.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination, a trailer, a truck for drawing the same, a connection between the truck and trailer, a braking apparatus for said trailer and truck including brakes on the truck and trailer, and means for automatically operating said braking apparatus and applying said brakes in the event said connection should become ineffective while the truck is drawing the trailer.

2. In combination, a trailer, a truck for drawing the same, a drawbar connecting the truck and trailer, a flexible member connecting the truck to the trailer and normally slack, a braking apparatus for said trailer and truck including brakes on the truck and trailer, a connection between said brakes and said flexible member whereby said apparatus will be operated and the brakes applied should the drawbar become ineffective while the truck is drawing the trailer and said flexible member be drawn taut.

3. In combination, a trailer, a truck for drawing the same, a drawbar connecting the truck and trailer, a flexible member connecting the truck to the trailer and normally slack, a braking apparatus for said trailer and truck including brakes on the truck and trailer, a connection between said brakes and said flexible member whereby said apparatus will be operated and the brakes applied should the drawbar become ineffective while the truck is drawing the trailer and said flexible member be drawn taut, and pawl and ratchet mechanisms for maintaining said brakes set after they have been applied.

4. In combination, a trailer, a truck for drawing the same, a drawbar connecting the truck to the trailer, a chain connected at its opposite ends to the truck and trailer and being of a length greater than the length necessary to connect the truck and the trailer and therefore normally slack, a braking apparatus for the trailer including brakes, a connection between said chain and said apparatus, which connection being adapted to operate the apparatus and apply the brakes should the drawbar become ineffective when the truck is drawing the trailer and said chain being drawn taut, said connection between the chain and said apparatus being adapted to become ineffective after said brakes have been applied, and ratchet mechanisms incorporated in said apparatus for maintaining said trailer brakes set after the same have been applied, said braking apparatus being operatively connected to the drawbar whereby manipulation of the drawbar will be accompanied by operation of the brakes, and means for releasing said ratchet mechanisms to enable operation of the brakes.

JOHN J. TOWNSEND.